No. 625,546. Patented May 23, 1899.
J. FAWELL.
BEARING FOR CRANK SHAFTS.
(Application filed Feb. 21, 1898.)
(No Model.) 2 Sheets—Sheet 1.
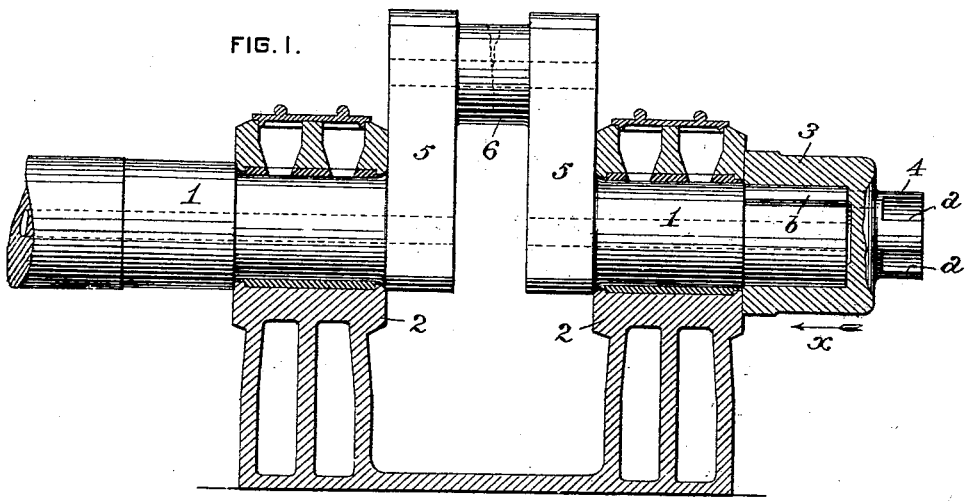
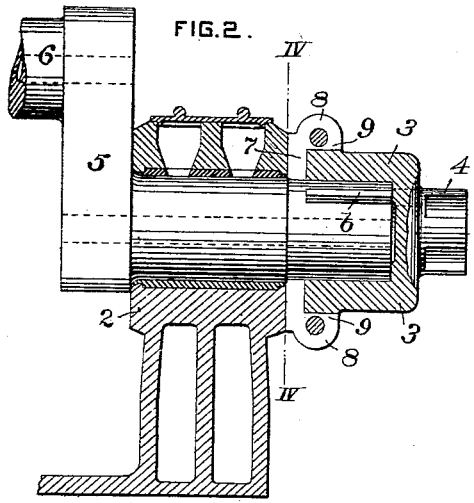
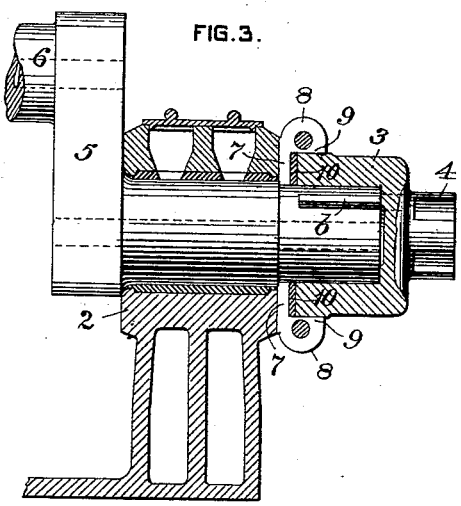
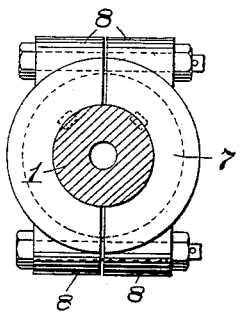
WITNESSES: Chas. F. Miller, F. E. Gaither
INVENTOR, Joseph Fawell by Darwin S. Wolcott Att'y.

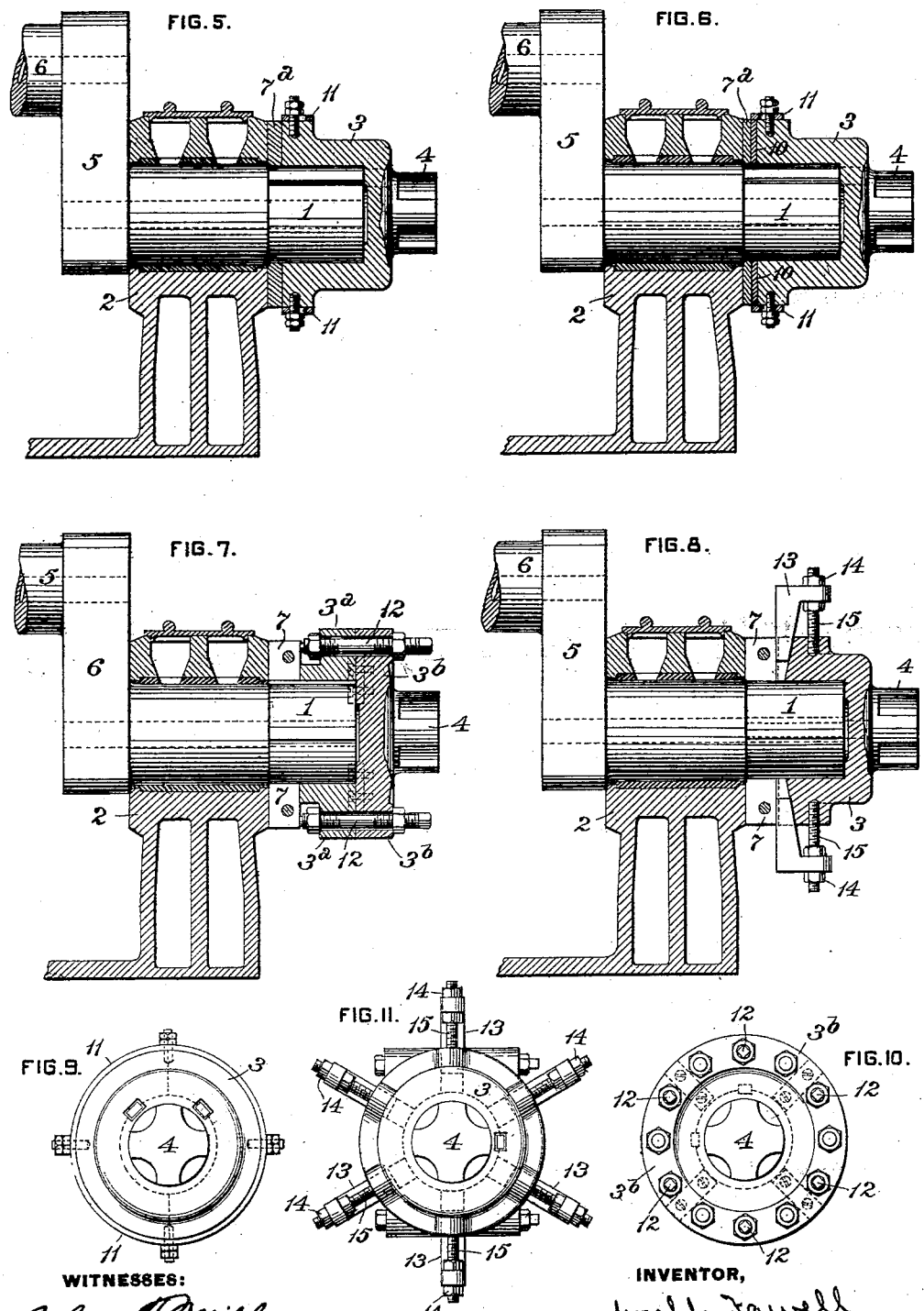

UNITED STATES PATENT OFFICE.

JOSEPH FAWELL, OF PITTSBURG, PENNSYLVANIA.

BEARING FOR CRANK-SHAFTS.

SPECIFICATION forming part of Letters Patent No. 625,546, dated May 23, 1899.

Application filed February 21, 1898. Serial No. 671,095. (No model.)

*To all whom it may concern:*

Be it known that I, JOSEPH FAWELL, a citizen of the United States, residing at Pittsburg, in the county of Allegheny and State of Pennsylvania, have invented or discovered certain new and useful Improvements in Bearings for Crank-Shafts, of which improvements the following is a specification.

The invention described herein relates to certain improvements in bearings for crank-shafts, the improvement being more especially applicable to the shafts of that class or kind of engines, such as rolling-mill engines, in which the crank-shaft is subjected to longitudinal thrusts, tending to break the crank-pins.

The object of the present invention is to provide for such an adjustment of the portions of the bearings which are subjected to wear due to the longitudinal thrust of the shaft as will prevent any flexing strains being borne by the crank-pins.

The invention is hereinafter more fully described and claimed.

In the accompanying drawings, forming a part of this specification, Figure 1 is a view, partly in elevation and partly in section, showing the crank-shaft of a blooming-mill engine and its bearings as at present constructed. Figs. 2 and 3 are sectional elevations of the same having my improvement applied thereto. Fig. 3 shows the manner of compensating for wear. Fig. 4 is a transverse section, the plane of section being indicated by the line IV IV, Fig. 2. Figs. 5 and 6 are views similar to Figs. 2 and 3, illustrating a modification of my improvement. Figs. 7 and 8 are views similar to Fig. 2 of further modifications of the invention; and Figs. 9, 10, and 11 are end views of the constructions shown in Figs. 5, 7, and 8, respectively.

For convenience of description and illustration I have shown my improvement applied to the crank-shaft 1 of a blooming-mill engine. This shaft is mounted in bearings 2 of the usual or any suitable construction. It is now generally preferred to connect the rolls of the blooming-mill directly to the shaft of the engine in lieu of driving the rolls through interposed gearing. Hence the crab 3 is provided with wabblers 4 and tightly keyed to the end of the shaft. In using such a mill the spindle or other portion of the mill connected to the shaft is not infrequently broken diagonally. The movement of the two inclined surfaces of the break over each other exerts a powerful end thrust on the crank-shaft in the direction of the arrow $x$. This end thrust presses the inner end of the crank-arm 5 toward the other crank-arm, thereby subjecting the pin 6 to severe strains, so that it is frequently crushed or broken, as indicated by dotted lines in Fig. 1. In order to relieve the crank-shaft of this end thrust, it is customary to so construct the crab that it will bear against the end of the shaft and that the opposite end will press against the side of the shaft-bearing 2. This expedient is effective until the bearing-surfaces of the crab and the shaft-bearing 2 are worn away, which is effected by the constant end thrust on the shaft due to the wearing away of the corners $a$ of the wabblers. As soon as this wearing occurs the shaft will be subjected in case of the breakage of the spindle to end thrust and the crank-pin to severe strains. As the removal of the crab and the substitution of a new one involve considerable delay and labor, it being necessary to drill out the keys $b$ and cut new seats, a mill is frequently kept in operation for a considerable time after repair is needed, and hence the safeguard now employed becomes ineffectual.

In order to permit of the quick and easy adjustment of the wearing-surfaces, the crab 3 and the portion of the shaft 1 projecting beyond the bearing 2 are so proportioned as to length that a wearing-ring 7 may be placed between the end of the crab and the face of the bearing 2. This wearing-ring is preferably so constructed that it will rotate with the shaft and crab. As shown in Figs. 2, 3, and 4, the ring may be in two sections and provided with radially-projecting lugs 8, whereby it may be tightly clamped around the shaft. It is preferred to construct the outer side of the ring with a flange 9, adapted to overlap the inner end of the crab and to be clamped thereto. As soon as the adjacent faces of the ring or bearing become worn away, so that the crank-pin will be subjected to injurious transverse strains, the ring 7 is removed and sectional washers or liners 10, of a thickness sufficient to fully compensate for the wearing away of the ring or face of the bearing, are placed around the shaft against the end of the crab and the wearing-ring again secured in position. If preferred, a new wearing-ring may be substituted for the old one; but such entire renewal would involve considerable expense as compared with the insertion of a liner or washer.

If desired, the wearing-ring may be made integral, as shown at $7^a$ in Figs. 5 and 6, and placed on the shaft ahead of the crab. This ring should fit the shaft loosely, so that it may be slid along when liners have to be inserted. In order to cause the wearing-ring to rotate with the shaft, as is preferred, the keys employed for holding the crab in position are extended through the wearing-ring. The liners are held in position between the crab and wearing-ring by any suitable means—such, for example, as the slotted ring 11, bolted to the crab and projecting over the liners or washers.

As shown in Figs. 7 and 8, the wearing-rings may be adjusted along the shaft and held in their adjusted positions without the use of liners.

In Figs. 7 and 10 I have shown my improvement in connection with a sectional crab, which is sometimes employed. This crab consists of the sleeve $3^a$, which is keyed to the shaft 1, and the plate $3^b$, having the wabblers formed integral therewith, secured to the sleeve by bolts. Alternate bolts 12 are made of sufficient length to bear against the wearing-ring and hold it as against movement along the shaft. When it is desired to shift the wearing-ring, the nuts on the outer ends of the bolts are loosened and those on the inner ends turned up, thereby shifting the bolts longitudinally and moving the ring along the shaft.

In the construction shown in Figs. 8 and 11 the wearing-ring is adjusted by a series of wedges 13, which are forced between the crab and wearing-ring by means of nuts 14 on the bolts 15, secured to the crab, as shown.

It will be readily understood by those skilled in the art that by the employment of an adjustable wearing-ring the crank-pin can be protected as against injurious strains and that such protection can be obtained with little or no labor or loss of time.

I claim herein as my invention—

1. The combination of a crank-shaft and wearing-ring normally secured to the shaft as against movement longitudinal thereof, and adapted to transfer end thrusts on the shaft to the bearing thereof and means for adjusting the wearing-ring along the shaft and holding it in such adjusted position, substantially as set forth.

2. The combination of a crank-shaft and bearing for said shaft, a crab secured to the shaft, a wearing-ring interposed between the crab and the bearing, and means for adjusting the wearing-ring and holding it in its adjusted position, substantially as set forth.

3. The combination of a crank-shaft and bearing for said shaft, a crab secured to the shaft, a removable wearing-ring interposed between the crab and one side of the bearing, and means for adjusting the wearing-ring longitudinally of the shaft and holding it in its adjusted position, substantially as set forth.

In testimony whereof I have hereunto set my hand.

JOSEPH FAWELL.

Witnesses:
 DARWIN S. WOLCOTT,
 F. E. GAITHER.